United States Patent [19]

Nishimoto et al.

[11] Patent Number: 5,147,959
[45] Date of Patent: Sep. 15, 1992

[54] OPTICAL RESIN ARTICLES

[75] Inventors: Shinobu Nishimoto, Moriyama; Eisuke Hirakawa, Kyoto; Minoru Fukuzawa, Kohka; Takashi Kato, Kashiwara; Akio Tani, Habikino, all of Japan

[73] Assignees: Kabushiki Kaisha Alpha Giken; Osaka Yuki Kagako Kogyo Kabushiki Kaisha, both of Osaka, Japan

[21] Appl. No.: 652,683

[22] Filed: Feb. 8, 1991

[51] Int. Cl.$^5$ .................. C08G 18/58; C08G 18/68; C08L 75/04; G02B 3/00
[52] U.S. Cl. .................. 528/48; 525/418; 525/451; 526/292.2; 528/73; 528/75; 359/642
[58] Field of Search .............. 525/418, 451; 526/292.2; 528/48, 73, 75; 359/642

[56] References Cited

U.S. PATENT DOCUMENTS

| | | | |
|---|---|---|---|
| 3,373,221 | 3/1968 | May | 528/73 |
| 3,478,126 | 11/1969 | Turpin | 528/73 |
| 4,331,735 | 5/1982 | Shanoski | 428/423.7 |
| 4,374,238 | 2/1983 | Shanoski | 528/59 |

FOREIGN PATENT DOCUMENTS

| | | |
|---|---|---|
| 58-14449 | 3/1983 | Japan . |
| 59-87127 | 5/1984 | Japan . |

*Primary Examiner*—John Kight, III
*Assistant Examiner*—Rabon Sergent
*Attorney, Agent, or Firm*—Armstrong, Nikaido, Marmelstein, Kubovcik & Murray

[57] ABSTRACT

The invention provides a shaped resin article for optical use which is a three-dimensional reaction product cast from a molding composition essentially comprising a tetrahalobisphenol A epichlorohydrin polycondensate-(meth)acrylic acid adduct (A) and a polyisocyanate compound (B). In another aspect of the invention, the resin article is cast from a composition containing a styrenic or ester monomer (C) in addition to (A) and (B). In still another aspect, the resin article is cast from a composition containing a phenolic compound (D) in addition to (A), (B) and (C).

1 Claim, No Drawings

OPTICAL RESIN ARTICLES

FIELD OF THE INVENTION

The present invention relates to an optical resin shaped article suited for lens and other optical systems.

BACKGROUND OF THE INVENTION

The recent rapid changeover to plastics in the field of spectacle and camera lenses gave impetus to the development of plastic lenses such as those of polymethyl methacrylate, polycarbonate, diethylene glycol bisallylcarbonate, etc., which are already in use, and the following and other plastic lenses excellent in clarity, impact resistance and refractive index.

For example, Japanese Kokai Tokkyo Koho No. 56-166214 (Japanese Patent Publication No. 58-14449) describes a method for producing a flame-resistant lens of high refractive index which comprises copolymerizing a dimethacrylate or diacrylate compound in which a halogen-substituted aromatic ring is bound to a methacroyloxy or acroyloxy group through an alkylene glycol group with an aromatic ring-containing radically polymerizable monofunctional monomer in the presence of a radical polymerization initiator.

Japanese Kokai Tokkyo Koho No. 57-136602 discloses a plastic lens of urethane resin type having a refractive index of 1.45-1.70 and an Abbe number of 35~60 which is based on an urethane resin produced by addition polymerization of a reaction product between an isocyanate compound and an OH-containing unsaturated compound.

Japanese Kokai Tokkyo Koho No. 59-87126 discloses a process for manufacture of a lens from a composition comprising an epoxy(meth)acrylate obtainable by reacting an epoxy resin, which is obtainable by condensation between bisphenol A and/or bisphenol F and epichlorohydrin, with (meth)acrylic acid, a compound containing two or more allyl or allylidene groups per molecule, a compound containing two or more mercapto groups per molecule and a radical polymerization initiator.

Japanese Kokai Tokkyo Koho No. 59-87127 describes a process for manufacture of a lens which comprises blending said epoxy[meth]acrylate with a vinyl monomer, pouring the resulting curable composition in a casting mold and curing the same with actinic radiation. Japanese Kokai Tokkyo Koho No. 59-87128 describes a process for manufacture of a lens which comprises pouring a curable composition prepared by mixing said epoxy(meth)acrylate with an aliphatic polyhydric alcohol (meth)acrylate ester into a casting mold and curing the same with actinic radiation. Furthermore, Japanese Kokai Tokkyo Koho No. 59-87129 describes a process for manufacture of a lens which comprises pouring said epoxy(meth)acrylate in a casting mold and curing it with actinic radiation.

Japanese Kokai Tokkyo Koho No. 60-103301 discloses a resin material for high refractive lenses which is a copolymer between a tetrahalobisphenol A diallyl carbonate-(meth)acrylic acid adduct and a monofunctional monomer.

Japanese Kokai Tokkyo Koho No. 61-200501 describes a process for manufacture of a plastic lens in which a reactive mixture or reaction intermediate comprising a tetrabromobisphenol-alkylene oxide adduct, a hydroxyalkyl (meth)acrylate and a non-yellowing aromatic ring-containing polyisocyanate is poured in a casting mold and cured in situ.

Japanese Kokai Tokkyo Koho No. 62-73201 discloses a plastic lens of high refractive index as produced by vinyl polymerization of an urethanated (meth)acryl monomer obtainable by reacting a 2,2-bisphenolsulfone (bisphenol S) derivative monohydroxymono(meth)acrylate with a polyfunctional isocyanate.

However, these known optical lenses are not fully satisfactory in all the performance and cost requirements, inclusive of clarity, refractive index, Abbe number and impact resistance. Furthermore, the availability of any other suitable optical resin would broaden the choice and enable the industry to meet ever more sophisticated market demands.

The object of the invention is to provide an optical resin product meeting the above-mentioned requirements in good balance with an economic advantage.

SUMMARY OF THE INVENTION

The present invention relates to a resin product for optical use which is a three-dimensional reaction product cast from a molding composition essentially comprising (A) a tetrahalobisphenol A epichlorohydrin polycondensate-(meth)acrylic acid adduct and (B) a polyisocyanate compound.

In another aspect, the present invention relates to an optical resin product which is a three-dimensional reaction product cast from a molding composition comprising (A) a tetrahalobisphenol A epichlorohydrin polycondensate-(meth)acrylic acid adduct, (B) a polyisocyanate compound and (C) a reactive diluent selected from the group consisting of styrenic monomers and ester monomers as main components.

In a further aspect, the present invention relates to an optical resin product which is a three-dimensional reaction product cast from a molding composition comprising (A) a tetrahalobisphenol A epichlorohydrin polycondensate-(meth)acrylic acid adduct, (B) a polyisocyanate compound, (C) a reactive diluent selected from the group consisting of styrenic monomers and ester monomers and (D) a phenolic compound as main components.

DESCRIPTION OF THE PREFERRED EMBODIMENTS

DETAILED

The tetrahalobisphenol A epichlorohydrin polycondensate-(meth)acrylic acid adduct (A) can be prepared by reacting tetrabromobisphenol A epichlorohydrin polycondensate or tetrachlorobispheol A epichlorohydrin polycondensate with acrylic acid or methacrylic acid.

The tetrahalobisphenol A epichlorohydrin polycondensate is preferably the reaction product between one mole of tetrahalobisphenol A and 2~1.2 moles of epichlorohydrin and can be represented by the general formula given below. It should be understood that while this reaction can be carried out using a further excess of epichlorohydrin, the outcome is simply that the excess epichlorohydrin is removed unreacted. On the other hand, a deficiency in epichlorohydrin should be avoided because the polycondensate would then be of high molecular weight.

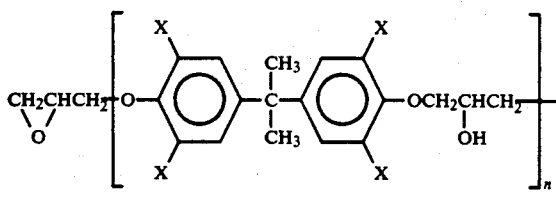

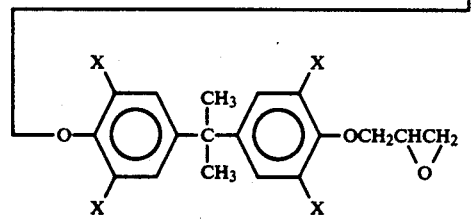

wherein X is Cl or Br and preferably Br; n is a whole number of 0~5, preferably 0-3. The above polycondensate may be a mixture of polycondensates varying in the value of n and such a mixture is rather preferred in many instances.

The polyisocyanate compound (B) includes a variety of diisocyanates such as hexamethylene-1,6-diisocyanate, isophorone diisocyanate, 2,2,4-trimethylhexamethyl diisocyanate, 4,4'-dicyclohexylmethane diisocyanene ate, lysine diisocyanate methyl ester, xylylene diisocyanate, tetramethylxylylene diisocyanate, bis(isocyanatomethyl)cyclohexane, tolylene diisocyanate, 4,4'-diphenylmethane diisocyanate and so on. In addition, a variety of tri- and polyfunctional isocyanates such as hexamethylene diisocyanate biuret, hexamethylene diisocyanate-trimethylolpropane adduct, 2-isocyanatoethyl-2,6-diisocyanatohexanoate, 1,6,11-undecane triisocyanate, isophorone diisocyanate-trimethylolpropane adduct, xylylene diisocyanate-trimethylolpropane adduct, bis(isocyanatomethyl)cyclohexane-trimethylolpropane adduct, etc. can also be employed.

The reactive diluent (C) is a styrenic monomer or-/and an ester monomer. The styrenic monomer includes, inter alia, styrene, methylstyrene, methoxystyrene, bromostyrene, dibromostyrene, tribromostyrene, chlorostyrene, dichlorostyrene and trichlorostyrene. The ester monomer includes diallyl phthalate, diallyl isophthalate, vinyl acetate and so on.

The phenolic compound (D) includes, inter alia, o-phenylphenol, p-phenylphenol, styrenated phenol, tribenzylphenol, o-phenylphenol glycidyl ether and so on. Of these compounds, o-phenylphenol glycidyl ether is a compound of the formula

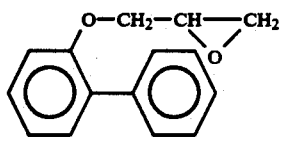

The reaction mole ratio of (B) to (A), in terms of NCO/OH, is 0.1~2.0, preferably 0.8~1.2.

The weight ratio of (A) to [C] is preferably selected within the range of 60/40~90/10.

When the proportions of these components are controlled as above, the reaction product most suited for the purposes of the invention is obtained.

When (D) is used, its ratio to (A) is suitably not over 30 weight percent, preferably 10~25 weight %. The combined use of (D) is instrumental in improving the refractive index of the product but an excess of (D) may detract from the resistance of the product to heat, solvents and impact.

The above components may be pre-polymerized in the presence of a polymerization initiator, NCO/OH reaction catalyst, ultraviolet absorber, antioxidant, antistatic agent, dye, stabilizer, etc. and the reaction product be then poured in a casting mold. After removal of dissolved gases, the mold is heated to initiate a curing reaction, whereby the desired three-dimensional reaction product can be obtained. It should be understood that the above pre-polymerization step may be sometimes omitted.

The polymerization initiator includes, inter alia, lauroyl peroxide, benzoyl peroxide, p-chlorobenzoyl peroxide, 2,4-dichlorobenzoyl peroxide, diisopropyloxy carbonate, di-2-ethylhexyl peroxycarbonate, t-butyl peroxypivalate, azobisisobutyronitrile, azobis(2,4-dimethylvaleronitrile), azobiscyclohexane nitrate and so on. The proportion of the polymerization initiator is appropriately about 0.01~0.5 weight percent based on the total of the above components, although certain derivations from this range are tolerated.

The NCO/OH reaction catalyst includes, inter alia, cobalt naphthenate, dimethyltin dichloride, dibutyltin dilaurate, stannous octoate, stannous chloride, antimony trichloride and so on. The amount of the NCO/OH reaction catalyst is appropriately in the range of 0.01 to 0.2 weight percent based on the sum of (A) and (B) but the range is not critical and even the use of such NCO/OH reaction catalyst can be omitted.

The reaction temperature for said optional preliminary polymerization is appropriately somewhere between room temperature and about 55° C. and, preferably about 40°-50° C. The in situ reaction temperature within the mold is room temperature ~about 120° C., preferably about 40~110° C. It is preferable to increase the temperature gradually or stepwise during the curing reaction.

After completion of the curing reaction, the mold is gradually cooled and the product is taken out.

The optical resin product obtained in this manner is useful in such applications such as the spectacle lens, camera lens, magnifying glass, polarizing lens, photochromic lens, diffraction grating, prism and so on.

The optical lens product can be subjected to various surface treatments such as antireflection coating, hard coating, antifogging treatment, treatment for imparting chemical resistance, dimming, antistatic treatment and so on.

The mechanism of reaction according to the present invention involves the reaction between the OH group of (A) and the NCO group of (B), the polymerization reaction of the acryloyloxy or methacryloyloxy group of (A), the homopolymerization reaction of (C) and the graft-polymerization of (C) to (A) and (B) or a reaction product thereof in a competitive fashion (where (D) is involved, at least some of its epoxy groups also take part) to give a complicated three-dimensional reaction product according to the invention.

The optical resin product according to the present invention is excellent in the most important quality parameters, viz. refractive index and Abbe number, of plastic lenses. Furthermore, this optical resin product is quite satisfactory in toughness, clarity, impact resistance, machinability and polishability, thus meeting all the requirements for lenses in a well-balanced manner.

In addition, since all the components of the molding composition are readily available from commercial sources, the invention is advantageous in terms of manufacturing cost and ease of application.

The examples given below are further illustrative of the invention. In the examples, all parts are by weight.

The characteristic parameters of the product were determined by the methods generally employed for the testing and evaluation of plastic lenses.

For reference, the methods for determination of refractive index $n_D^{20}$ and Abbe $\nu_D$ number are described below.

Refractive index $n_D^{20}$

Using an Abbe's refractometer, the refractive index at 20° C. was measured. Monobromonaphthalene was used as the contacting solution.

Abbe number $\nu_D$

Based on the indices of refraction with the D line of 5892.9Å, F line of 4861.3 Å and C line of 6562.7 Å at 20° C., the Abbe number was calculated by means of the following equation.

$$\nu_D = (n_D - 1)/(n_F - n_C)$$

EXAMPLE 1

Twenty-six (26.0) parts of an adduct (A) obtained by reacting a tetrabromobisphenol A epichlorohydrin polycondensate having an average polycondensation degree of n=0.22 with methacrylic acid was diluted with 24.0 parts of diallyl phthalate, and 5.0 parts of xylylene diisocyanate (B), 0.07 part of a polymerization initiator (Japan Hydrazine, Inc., ABN-V), 0.06 part of an ultraviolet absorber (Kyodo Chemical Co., Ltd., VIOSORB-520) and 0.05 part of an antioxidant (Ciba-Geigy, Irganox 1076) were mixed and dissolved at room temperature.

The resulting composition was poured in a glass mold pretreated with a mold release.

The mold temperature was increased according to a heating schedule of 12 hours from 40° to 55° C., 2 hours from 55° to 60° C., 2 hours from 60° to 70° C., 1 hour from 70° to 90° C., and 1 hour at 90° C. to cause the composition to cure in situ. The mold was then gradually cooled and the product was taken out.

EXAMPLE 2

The procedure of Example 1 was repeated except that the charging amount of adduct (A) was changed to 24.0 parts and 26.0 parts of diallyl isophthalate was used in lieu of 24.0 parts of diallyl phthalate.

The products obtained in Examples 1 and 2 were both tough, high in clarity and satisfactory in impact resistance, machinability and polishability.

The lens characteristics of these products are shown in Table 1.

TABLE 1

| | Refractive index $n_D^{20}$ | Abbe number $\nu_D$ |
|---|---|---|
| Example 1 | 1.572 | 30.8 |
| Example 2 | 1.574 | 30.9 |

EXAMPLE 3

Thirty-five (35.0) parts of tetrabromobisphenol A epichlorohydrin polycondensate (average polycondensation degree n=0.22)-methacrylic acid adduct {A} was diluted with 15.0 parts of styrene, and 10.0 parts of styrenated phenol [D], 6.0 parts of hexamethylene-1,6-diisocyanate (B), 0.12 part of a polymerization initiator (Japan Hydrazine, Inc., ABN-V), 0.0036 part of dibutyltin dilaurate, 0.11 part of an ultraviolet absorber (Kyodo Chemical Co., Ltd. VIOSORB-520) and 0.06 part of an antioxidant (Ciba-Geigy, Irganox 1076) were mixed and dissolved at room temperature.

The above composition was poured in a glass mold pretreated with a mold release and cured by the same heating schedule as in Example 1.

EXAMPLE 4

The procedure of Example 3 was repeated except that 10.0 parts of tribenzylphenol (D) was used in lieu of 10.0 parts of styrenated phenol (D).

EXAMPLE 5

The procedure of Example 3 was repeated except that 10.0 parts of o-phenylphenol (D) was used in lieu of 10.0 parts of styrenated phenol (D).

EXAMPLE 6

Thirty-five (35.0) parts of tetrabromobisphenol A epichlorohydrin polycondensate (average polycondensation degree n=0.22)-methacrylic acid adduct (A) was diluted with 15.0 parts of styrene (C), and 10.0 parts of styrenated phenol, 6.7 parts of xylylene diisocyanate (B), 0.12 part of a polymerization initiator (Japan Hydrazine, Inc., ABN-V), an ultraviolet absorber (Kyodo Chemical Co,. Ltd., VIOSORB-520) and 0.06 part of an antioxidant (Ciba-Geigy, Irganox 1076) were mixed and dissolved at room temperature.

The above composition was poured in a glass mold pretreated with a mold release and cured by the same heating schedule as in Example 1.

EXAMPLE 7

The procedure of Example 6 was repeated except that 10.0 parts of tribenzylphenol (D) was used in lieu of 10.0 parts of styrenated phenol (D).

EXAMPLE 8

The procedure of Example 6 was repeated except that 10.0 parts of o-phenylphenol (D) was used in lieu of 10.0 parts of styrenated phenol (D).

EXAMPLE 9

Twenty-four (24.0) parts of tetrabromobisphenol A epichlorohydrin polycondensate (average polycondensation degree n=0.22)-methacrylic acid adduct (A) was diluted with 26.0 parts of diallyl isophthalate (C), and 10.0 parts of o-phenylphenol glycidyl ether (D), 6.0 parts of hexamethylene-1,6-diisocyanate (B), 0.12 part of a polymerization initiator (Japan Hydrazine, Inc., ABN-V), 0.11 part of an ultraviolet absorber (Kyodo Chemical Co., Ltd., VIOSORB-520) and 0.06 part of an antioxidant (Ciba-Geigy, Irganox 1076) were mixed and dissolved at room temperature.

The above composition was poured in a glass mold pretreated with a mold release and cured by the same heating schedule as in Example 1.

The products obtained in Example 3~9 were all tough, high in clarity, and satisfactory in impact resistance, machinability and polishability.

The lens characteristics of these products are shown in Table 2.

TABLE 2

|  | Refractive index $n_D^{20}$ | Abbe number $\nu_D$ |
|---|---|---|
| Example 3 | 1.597 | 32.8 |
| Example 4 | 1.602 | 31.4 |
| Example 5 | 1.604 | 31.4 |
| Example 6 | 1.605 | 30.9 |
| Example 7 | 1.612 | 29.7 |
| Example 8 | 1.612 | 29.5 |
| Example 9 | 1.589 | 30.5 |

EXAMPLES 10 AND 11

The procedure of Example 9 was repeated except that the tetrabromobisphenol A epichlorohydrin polycondensate (average polycondensation degree n=0.22)-methacrylic acid adduct (A) was replaced with 24.0 parts of the corresponding adduct (A) wherein n=0.39 (Example 10) or n=1.56 (Example 11). The results are substantially similar to those in Example 9.

EXAMPLE 12

41.4 Parts of tetrabromobisphenol A epichlorohydrin polycondensate (average polycondensation degree n=1.7)-methacrylic acid adduct was diluted with 17.7 parts of styrene, and 9.4 parts of xylylene diisocyanate, 0.06 part of lauroyl peroxide, 0.001 part of dibutyltin dilaurate, 0.07 part of an ultraviolet absorber (Ciba-Geigy, Tinuvin 328), and 0.07 part of an antioxidant (Ciba-Geigy, Irganox 1076) were mixed and dissolved at room temperature.

The above composition was prepolymerized at 45° C. for 3 hours and, then, poured in a glass mold pretreated with a mold release.

The mold was then heated according to a schedule of 2 hours at 50° C., 10 hours at 60° C., 5 hours at 70° C., hours at 80° C., 3 hours at 90° C., 2 hours at 100° C. and 0.5 hour at 120° C. The mold was then gradually cooled and the product was taken out.

EXAMPLE 13

The procedure of Example 12 was repeated except that 0.07 part of Irganox 245 (Ciba-Geigy, an anti-oxidant) was used in lieu of Irganox 1076.

EXAMPLE 14

41.4 Parts of the same tetrabromobisphenol A epichlorohydrin polycondensate-methacrylic acid adduct as used in Example 12 was diluted with 17.7 parts of styrene, and 9.4 parts of tetramethylxylylene diisocyanate, 0.06 part of lauroyl peroxide, 0.001 part of dibutyltin dilaurate, 0.07 part of Tinuvin 328 (Ciba-Geigy, an ultraviolet absorber) and 0.07 part of Irganox 1076 (Ciba-Geigy, an antioxidant) were mixed and dissolved at room temperature.

This composition was molded as in Example 12.

EXAMPLE 15

The procedure of Example 14 was repeated except that 0.07 part of Irganox 245 (Ciba-Geigy, an anti-oxidant) was used in lieu of Irganox 1076.

The products obtained in Examples 12-15 were invariably tough, high in clarity and satisfactory in impact resistance, machinability and polishability.

The lens characteristics of these products are shown in Table 3.

TABLE 3

|  | Refractive index $n_D^{20}$ | Abbe number $\nu_D$ | Specific gravity $d^{20}$ |
|---|---|---|---|
| Example 12 | 1.596 | 32.4 | 1.48 |
| Example 13 | 1.596 | 31.8 | 1.48 |
| Example 14 | 1.586 | 31.7 | 1.38 |
| Example 15 | 1.586 | 32.0 | 1.38 |

EXAMPLE 16

One-hundred (100) parts of the same tetrabromobisphenol A epichlorohydrin polycondensate-methacrylic acid adduct as used in Example 12 was diluted with 25 parts of p-chlorostyrene and 17.68 parts of styrene, and 23.17 parts of o-phenylphenol glycidyl ether, 18.24 parts of hexamethylene-1,6-diisocyanate, 0.17 part of Harisorb U-101 (Harima Chemical Industries, Ltd., an ultraviolet absorber) and, as catalysts, 0.03 part of dibutyltin dilaurate and 0.19 part of azobisisobutyronitrile were mixed and dissolved at room temperature. The resulting composition was poured in a glass mold.

The mold was heated according to a heating schedule of 13 hours from 40° to 55° C., 3 hours from 55° to 70° C., 1 hour from 70° to 90° C. and 1 hour at 90° C. to cause the composition to cure in situ. The mold was then gradually cooled and the product was taken out.

EXAMPLE 17

The procedure of Example 16 was repeated except that 20.40 parts of xylylene diisocyanate was used in lieu of 18.24 parts of hexamethylene-1,6-diisocyanate.

EXAMPLE 178

The procedure of Example 16 was repeated except that 29.41 parts of 4,4'-dicyclohexylmethane diisocyanate was used in lieu of 18.24 parts of hexamethylene-1,6-diisocyanate.

The products obtained in Examples 16 to 18 were invariably tough, high in clarity, and excellent in impact resistance, machinability and polishability.

The lens characteristics of these products are shown in Table 4.

TABLE 4

|  | Refractive index $n_D^{20}$ | Abbe number $\nu_D$ | Specific gravity $d^{20}$ |
|---|---|---|---|
| Example 16 | 1.597 | 32.2 | 1.38 |
| Example 17 | 1.606 | 30.9 | 1.40 |
| Example 18 | 1.591 | 32.5 | 1.35 |

What is claimed is:

1. A plastic lens which is a three dimensional reaction product cast from a mold composition comprising a tetrahalobisphenol A epichlorohydrin polycondensate-(meth) acrylic acid adduct (A), a polyisocyanate compound (B), a reactive diluent (C) selected from the group consisting of styrenic monomers and ester monomers, and a phenolic compound (D) selected from the group consisting of 0-phenylphenol, styrenated phenol, tribenzylphenol and o-phenylphenol glycidyl ether.

* * * * *